United States Patent [19]

Howkins

[11] Patent Number: 4,509,059
[45] Date of Patent: Apr. 2, 1985

[54] METHOD OF OPERATING AN INK JET

[75] Inventor: Stuart D. Howkins, Ridgefield, Conn.

[73] Assignee: Exxon Research & Engineering Co., Florham Park, N.J.

[21] Appl. No.: 384,131

[22] Filed: Jun. 1, 1982

[51] Int. Cl.³ ............................................ G01D 15/18
[52] U.S. Cl. .................................. 346/1.1; 346/140 R
[58] Field of Search .......................... 346/1.1, 140 PD

[56] References Cited

U.S. PATENT DOCUMENTS

| 3,683,212 | 8/1972 | Zoltan | 310/8.3 |
|---|---|---|---|
| 3,828,357 | 8/1974 | Koeblitz | 346/140 R |
| 3,878,519 | 4/1975 | Eaton | 346/1 |
| 3,893,131 | 7/1975 | Perel et al. | 346/140 |
| 3,898,673 | 8/1975 | Haskell | 346/140 |
| 3,946,398 | 3/1976 | Kyser et al. | 346/1.1 |
| 4,016,571 | 4/1977 | Yamada | 346/75 |
| 4,037,230 | 7/1977 | Fujimoto et al. | 346/75 |
| 4,046,961 | 9/1977 | Brown | 179/1 |
| 4,047,183 | 9/1977 | Taub | 346/1 |
| 4,072,958 | 2/1978 | Hayami et al. | 346/140 R |
| 4,104,646 | 8/1978 | Fischbeck | 346/140 PD |
| 4,112,433 | 9/1978 | Vernon | 346/1.1 |
| 4,126,867 | 11/1978 | Stevenson, Jr. | 346/140 R |
| 4,150,384 | 4/1979 | Meece | 346/75 |
| 4,183,030 | 1/1980 | Kaieda et al. | 346/140 R |
| 4,184,169 | 1/1980 | Taylor et al. | 346/140 R |
| 4,228,440 | 10/1980 | Horike et al. | 346/75 |
| 4,383,264 | 5/1983 | Lewis | 346/140 PD |

FOREIGN PATENT DOCUMENTS 0046676  3/1982  European Pat. Off. .

OTHER PUBLICATIONS

IBM Technical Disclosure Bulletin, vol. 15, No. 4, 9/72, "Ink Jet High-Voltage Power Supply" H. E. Naylor and D. L. West, pp. 1371-1372.

Primary Examiner—A. D. Pellinen
Assistant Examiner—Derek Jennings

[57] ABSTRACT

The transducer of a demand ink jet is driven by voltage so as to project a droplet of ink from the orifice of an ink chamber on demand. After the chamber of the jet has been filled, an abrupt change in drive voltage level of the transducer disturbs the meniscus of ink in the orifice of the jet so as to move the meniscus away from the chamber. When the meniscus has reached a predetermined position and velocity in the orifice, the drive voltage level supplied to the transducer is substantially changed so as to eject the droplet from the orifice. The change in drive voltage level is contoured so as to minimize high frequency components. An array of ink jets may be similarly driven where the differences from jet to jet are compensated by wave shaping including variations from jet to jet in the period of time between perturbation and the substantial voltage level change leading to droplet projection.

36 Claims, 7 Drawing Figures

METHOD OF OPERATING AN INK JET

BACKGROUND OF THE INVENTION

This invention relates to ink jets, and more particularly, ink jets of the demand type or impulse type.

Ink jets of the demand type include a transducer in one form or another which is coupled to a chamber adapted to be supplied with ink. The chamber includes an orifice for ejecting droplets of ink when the transducer has been driven or pulsed by an appropriate drive voltage. The pulsing of the ink jet abruptly reduces the volume of the jet so as to advance the meniscus away from the chamber and form a droplet of ink from that meniscus which is ejected away from the ink jet.

In order to achieve the formation of the droplet by the sudden reduction in volume of the ink jet chamber, the pulse which is applied to the transducer has an extremely steep fall time (or rise time). U.S. Pat. No. 4,104,646—Fischbeck discloses the typical pulse shape utilized in driving a demand ink jet.

The achievement of high speeds in ink jet printing has been somewhat of a problem. High speeds in ink jet printing require that demand ink jets operate on an extremely high droplet projection rate. This in turn requires some control of the meniscus between droplet projections so that each droplet will be projected from the ink jet at the exact moment the droplet is called for. In order to achieve some control of the meniscus, it has been proposed in the above-mentioned Fischbeck patent, as well as U.S. Pat. No. 4,112,433—Vernon, that the transducer be driven with a secondary pulse immediately after projection of the droplet so as to damp the meniscus. However, filling of the chamber after the meniscus has been damped can still result in uncertainty and mislocation of the meniscus at the time of firing or droplet projection which occurs sometime later.

Other problems associated with demand ink jets include low droplet velocities, incorrect drop size and production of undesirable satellite droplets. Problems are only compounded when an array of ink jets are utilized where it is desirable to achieve the same droplet projection characteristics from jet to jet.

SUMMARY OF THE INVENTION

It is an overall object of this invention to provide overall improvement in the performance characteristics of a demand ink jet.

It is a more specific object of this invention to achieve improved performance in a demand ink jet operating at high droplet projection rates.

It is a further specific object of this invention to achieve desired droplet velocities from demand ink jets.

It is a still further specific object of this invention to achieve reliability in drop size from a demand ink jet.

It is another specific object of this invention to avoid undesirable satellite droplets.

It is a still further object of this invention to achieve uniform operating characteristics from jet to jet in an array of demand ink jets.

It is a still further object of this invention to reduce unwanted interference between channels in an array of jets (i.e. cross-talk).

It is a still further object of this invention to avoid undesirable effects of low velocity or, in the extreme, failure to fire when a jet has been idle for a period of time (i.e. start-up effect).

In accordance with these and other objects which will become clear from a reading of the subsequent specification and claims, the drive applied to the transducer of a demand ink jet is wave-shaped, i.e., tailored to have a particular shape.

In accordance with one important aspect of the invention, the wave shape of the drive includes a perturbation after filling so as to disturb the meniscus and move the meniscus in a predetermined direction at a predetermined velocity. Perturbation in the wave shape is then followed substantially immediately by a more substantial change in the wave shape so as to eject a droplet from the orifice when the meniscus is in a predetermined position and moving at a predetermined velocity.

In accordance with another important aspect, the wave shape of the more substantial change in drive level is contoured such that the rate of change in the rate of change is minimized; i.e., the second derivative with respect to time is minimized. In the preferred embodiment of the invention, this is achieved in accordance with the following formula:

$$V = V_0\left(1 - \frac{2t^2}{\tau^2}\right) \text{ for } 0 \leq t \leq \tau/2$$

$$V = 2V_0\left(1 - \frac{2t}{\tau} + \frac{t^2}{\tau^2}\right) \text{ for } \tau/2 \leq t \leq \tau$$

where V represents the drive level expressed as a voltage which is a function of time t; $V_0$ is the voltage level of the wave shape at the time of firing and $\tau$ is the fall or rise time. By contouring the wave shape at the time of firing in this manner, the production of satellite drops is suppressed and the appropriate drop velocities and drop sizes may be achieved. In the preferred embodiment of the invention, the drive applied to the transducer is a voltage where the perturbation is represented by an abrupt substantially instantaneous voltage change $V_1$ from the first level to a second level. The second level is maintained for a period $\tau_1$ until a more substantial change in level to a third level at the time of firing. In the preferred embodiment, the duration of the second level is relatively short as compared to the first level or the third level.

In accordance with another important aspect of the invention, an array of ink jets is driven in accordance with the above-described wave shapes. However, the ink jets are compensated with respect to one another so as to achieve substantial uniformity in operation. The compensation or adjustment in order to achieve such uniformity in the preferred embodiment involves varying or adjusting the duration of $\tau_1$ and the magnitude $V_0$ and $V_1$ so as to control the drop velocity and drop size and substantially limit satellite production.

In accordance with another important aspect of the invention, the adjustment or variation of $\tau_1$, $V_1$ and $V_0$ may be made dynamically while the jet is in operation.

In accordance with a still further important aspect of the invention, an ink jet is operated by initiating filling of an ink jet chamber upon demand prior to ejecting ink from the ink jet orifice. Subsequently, the ink is ejected from the ink jet orifice a predetermined period of time after filling is initiated.

DETAILED DESCRIPTION OF A PREFERRED EMBODIMENT

Figure 1:
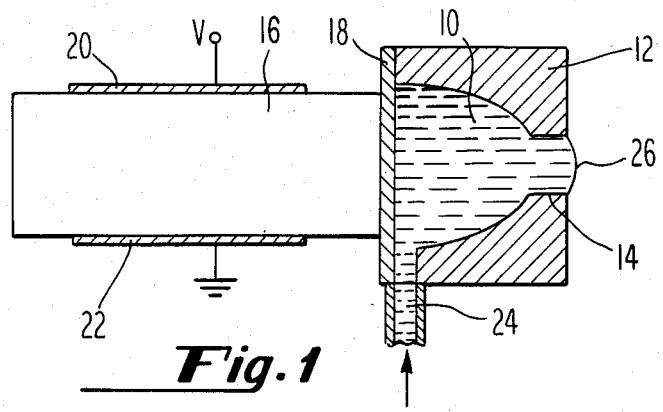
FIG. 1 is a sectional view of an ink jet representing a preferred embodiment of the invention.

FIG. 1 discloses a demand ink jet representing a preferred embodiment of the invention. The jet includes the variable volume chamber 10 formed within a housing 12 which includes an orifice 14. A transducer 16 is coupled to the chamber 10 through a diaphragm 18. The volume of the chamber is varied in response to the state of energization of the transducer 16 which is controlled by the application of an electric field as a result of a drive voltage V applied between an electrode 20 connected to the voltage V and an electrode 22 connected to ground.

A supply port 24 supplies ink to the chamber 10. A meniscus of ink 26 is formed at the orifice 14. As the volume of the chamber 10 expands and contracts, the meniscus 26 moves into the chamber 10 and away from the chamber 10 respectively.

Figure 2:
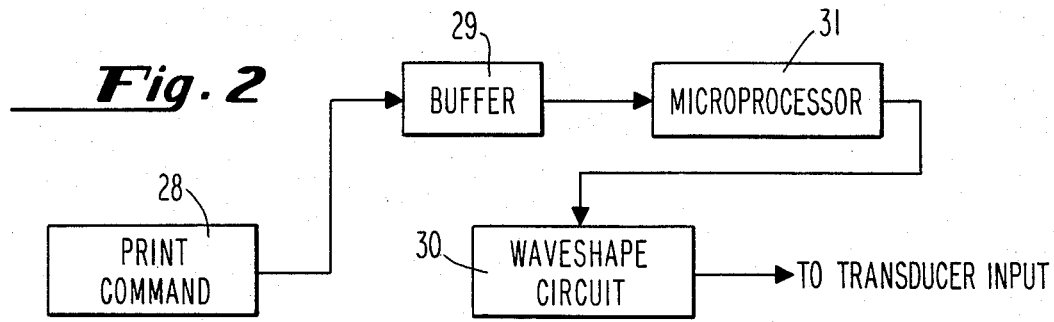
FIG. 2 is a block diagram of circuitry utilized in driving the transducer of the ink jet shown in FIG. 1.

Referring now to FIG. 2, the drive voltage V applied to the transducer 16 is generated in response to a suitable print command circuit 28. In accordance with this invention, the output of the print command circuit 28 is applied to a wave shaping circuit 30 via a buffer 29 and a microprocessor circuit 31 so as to generate a voltage V wave shape which will now be described with reference to FIG. 3.

Figure 3:
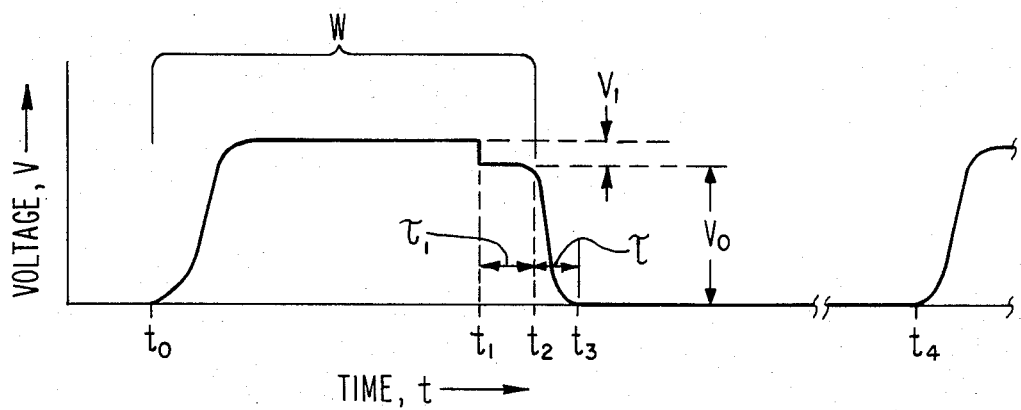
FIG. 3 represents the wave shape of the drive voltage applied to the transducer of FIG. 1 by the circuitry of FIG. 2.

Referring to FIG. 3, the voltage V is represented by the ordinate and time t is represented by the abscissa. In operating the ink jet shown in FIG. 1, filling of the chamber 10 begins at time $t_0$ by substantially increasing the voltage shortly after the time $t_0$ for a first period extending up to time $t_1$. During this time, the transducer 16 is contracted along its axis so as to expand the volume of the chamber 10 of the jet shown in FIG. 1 so as to permit filling of the chamber 10.

It is an important aspect of the invention that this filling action occurs at a fixed time prior to droplet ejection. When the droplet ejection rate (frequency) is varied during the normal printing sequence, the time between filling and firing remains constant. This results in more uniform response of the jet with changing frequency in contrast with other ink jet printers where the time between firing and refill has been held constant.

Uniform operation of the device up to high frequencies depends on a proper choice of pulse width W. To achieve high frequency operation, short pulse widths are necessary and hence the firing of the jet occurs while the meniscus is still in motion as a result of the disturbance caused by the refill and the disturbance caused by the previous drop ejection. Proper choice of a short pulse width makes the droplet velocity and size relatively insensitive to the contribution to the overall meniscus motion caused by the previous drop ejection. The droplet velocity and size are thus primarily determined by the residual meniscus motion from the refill and as pulse width is held constant, the droplet velocity and size remain constant.

In accordance with one important aspect of the invention, a perturbation is created in the voltage at time $t_1$ so as to achieve an abrupt voltage change $V_1$ from the first level just prior to time $t_1$ to a second level which is substantially sustained in the period $\tau_1$ between times $t_1$ and $t_2$. This perturbation in the voltage V slightly reduces the volume of the chamber 10 which, as will be explained in somewhat more detail later, produces motion of the meniscus 26 outwardly away from the chamber 10.

At time $t_2$, voltage V is again substantially changed so as to reduce the voltage from the second level to a third level at time $t_3$. This produces yet a further reduction in the size of the volume which is sufficiently substantial to further advance the meniscus 26 outwardly away from the chamber 10 so as to form a droplet which is projected outwardly from the orifice 14 toward a target.

In accordance with another important aspect of the invention, the substantial change in the voltage V beginning at time $t_2$ is abrupt. However, the voltage change is appropriately contoured so as to minimize high frequency components and suppress satellite droplet production. This contouring of the voltage in the period $\tau$ between times $t_2$ and $t_3$ is consistent with the following relationship:

$$V = V_0 \left( 1 - \frac{2t^2}{\tau^2} \right) \text{ for } 0 \leq t \leq \frac{\tau}{2}$$

$$V = 2V_0 \left( 1 - \frac{2t}{\tau} + \frac{t^2}{\tau^2} \right) \text{ for } \frac{\tau}{2} \leq t \leq \tau$$

where $V_0$ is the drive voltage during the second period $\tau_1$ from time $t_1$ to $t_2$ and $\tau$ is the fall time of the voltage V in the period or time lapse between time $t_2$ and $t_3$ which may be controlled. In other words, the rate of change of the rate of change of voltage V in the period between times $t_2$ and $t_3$ is minimized. This is one particular way of contouring the voltage to suppress satellites. Other ways of smoothing (i.e., filtering out high frequency components from the voltage step) would have similar beneficial effects. By controlling the voltage $V_0$ and $V_1$ the droplet velocity and size may be controlled, and the formation of satellites minimized, e.g., increases in the voltage $V_0$ produces higher drop velocities. Also, by controlling the value of $\tau$, the drop size and velocity may be controlled, e.g., reducing the $\tau_1$ increases drop size and velocity.

In accordance with another important aspect of the invention, the adjustment of $\tau_1$, $V_1$ and $V_0$ is varied or even dynamically varied while the jet is in operation. This is achieved by the use of the microprocessor 31 programmed to compensate for any lack of uniform frequency response of the jet and cross-talk from adjacent channels. The values of $\tau_1$, $V_1$, and $V_0$ are dynamically varied according to the time since the last-firing of the jet and also the number and position of neighboring channels which are firing simultaneously with the channel in question. This also requires that the firing command be buffered in the buffer 29 to allow time for the microprocessor to adjust $\tau_1$, $V_1$, and $V_0$. In this way the control of drop velocity, drop size and satellite production can be extended to yet higher frequencies and more uniform operation can be achieved by the elimination of velocity change induced by cross-talk. Another source of trouble in ink jets that would be substantially reduced by this technique is the so-called "start-up" effect where a jet fails to fire or fires at a very low velocity when it has been idle for a period of time. In these circumstances, the microprocessor would dynamically substantially increase $V_0$, with a small value for $\tau_1$, to increase the velocity $V_1$ and $\tau_1$ may be dynamically varied in response to frequency of jet operation to control drop velocity, drop size and satellite production. However, it will be appreciated that substantial improvements can be made by using one variable, $\tau_1$, only, thus simplifying and reducing the cost of the equipment.

Referring still to FIG. 3, it will be understood that a period $t_3$ to $t_4$ exists wherein the transducer 60 is substantially in a quiescent state. The period $t_3$ to $t_4$ changes when the frequency of the jet changes. A minimum value is set by the condition that the refill disturbance should not interfere with the previous droplet ejection. Once the drop has separated from the meniscus, no interference is possible so that the drop break-off time represents a safe minimum for $t_4$-$t_3$. In practice it is found that times somewhat less than this can be tolerated. The period between $t_1$ and $t_2$ is of a substantial lesser duration than the first period from time $t_0$ to $t_1$.

Figure 4:
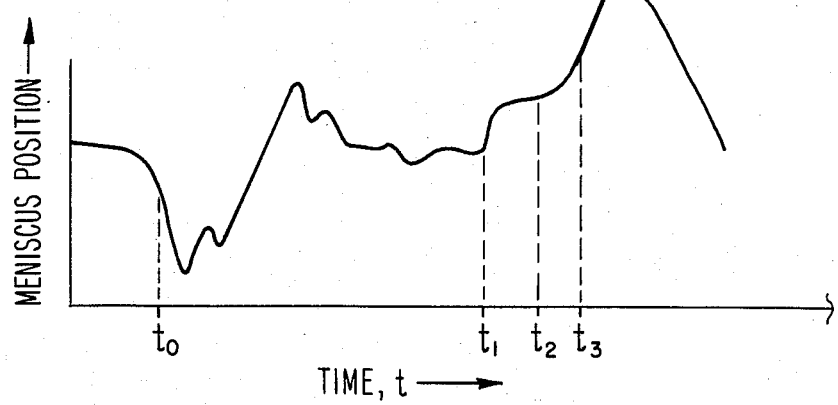
FIG. 4 plots meniscus position as a function of time.

FIG. 4 depicts the position of the meniscus as a function of time t wherein meniscus position is plotted on the ordinate and time t is plotted on the abscissa. Prior to time $t_0$, the meniscus is in a relatively constant, quiescent state. It may have some residual motion from previous drop ejection but this motion is small compared with motion induced by filling. However, at time $t_0$ when filling is initiated, the meniscus retracts well into the orifice 14 toward the chamber 10. During filling between times $t_0$ and $t_1$, the meniscus moves first inwards and then outwardly from the chamber 10 but does tend to vary somewhat in position, even oscillate, up until time $t_1$. At the time $t_1$, the volume of the chamber 10 undergoes an abrupt but relatively small volumetric change which in turn initiates an abrupt movement of the meniscus outwardly away from the chamber 10. By the time $t_2$, at the conclusion of the period $\tau_1$ which may be fully controlled and even varied, the meniscus which is traveling at a predetermined velocity has reached a predetermined position such that another abrupt but relatively large volumetric change in the chamber at time $t_2$ will result in reliable droplet projection since the position of the meniscus is known at time $t_2$. The abrupt and relatively large volumetric change is accompanied by an abrupt movement of the meniscus which is somewhat tempered by the relatively slow fall time of the voltage V as depicted in FIG. 3. This movement of the meniscus during the period between times $t_2$ and $t_3$ projects a droplet outwardly away from the orifice once the meniscus has traveled a sufficient distance to form a droplet.

It will be appreciated that the predetermined position of the meniscus which is traveling at a predetermined velocity at time $t_2$ is achieved only by carefully controlling the length of the second period between times $t_1$ and $t_2$. Moreover, in a particularly preferred embodiment involving an array of ink jets, it may be desirable to carefully control the period from time $t_1$ to $t_2$ as a function of droplet projection rate by means of a microprocessor.

Figure 5:
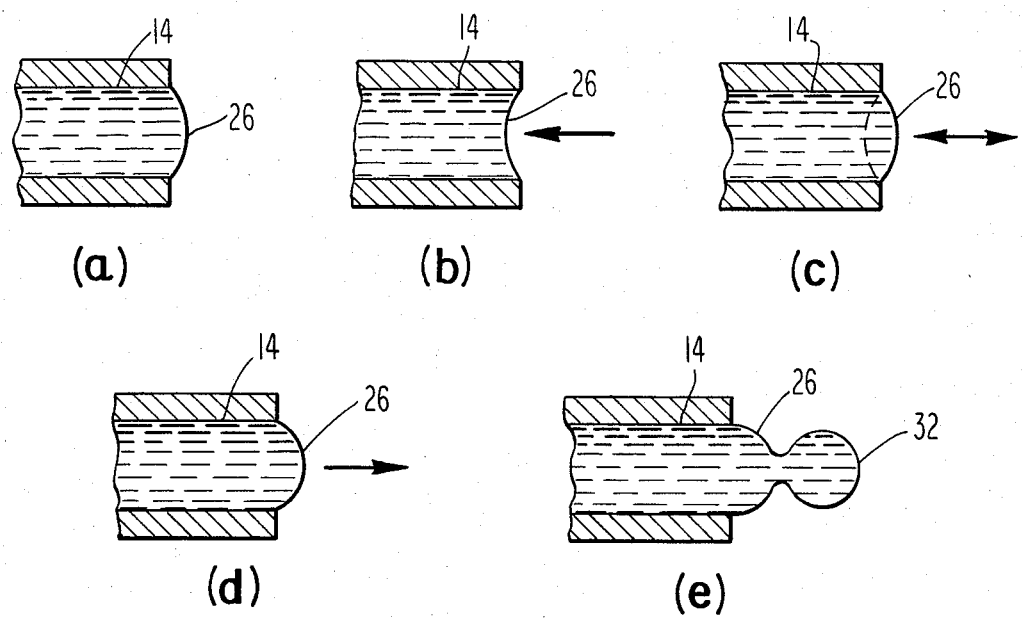
FIG. 5 illustrates various meniscus positions as a function of time.

Reference will now be made to FIG. 5 for a clear physical understanding of meniscus position as a function of time. In FIG. 5a, the meniscus 26 is shown in the orifice 14 as quiescent or moving with slight residual motion from a previous drop ejection corresponding to a time immediately prior to $t_0$. FIG. 5b depicts the meniscus 26 and the orifice 14 after time $t_0$ in which the meniscus is directed rearwardly toward the chamber as depicted by the arrow. This position of the meniscus 26 corresponds with the meniscus position sometime between time $t_0$ and $t_1$.

FIG. 5c illustrates the meniscus 26 within the orifice 14 but in an oscillating mode as depicted by the arrows which are intended to show movement of the meniscus 26 in both a direction away from the chamber and toward the chamber.

In accordance with this invention, the meniscus 26 is now disturbed so as to be moved at a predetermined velocity away from the chamber as depicted by the arrow. By controlling the length of time between $t_1$ and $t_2$, i.e., the length of time $\tau_1$ as shown in FIG. 3, the exact position of the meniscus 26 may be controlled at time $t_2$. Finally, the meniscus 26 is pushed outwardly further away from the chamber to the point at which the momentum of ink wll lead the meniscus eventually to such extreme deformation that a droplet 32 is formed. This, of course, occurs sometime later than time $t_3$ as depicted in FIGS. 3 and 4. However, since the high frequency components of the change in the voltage V are eliminated, only a single droplet 32 is formd without any satellites.

Figure 6:
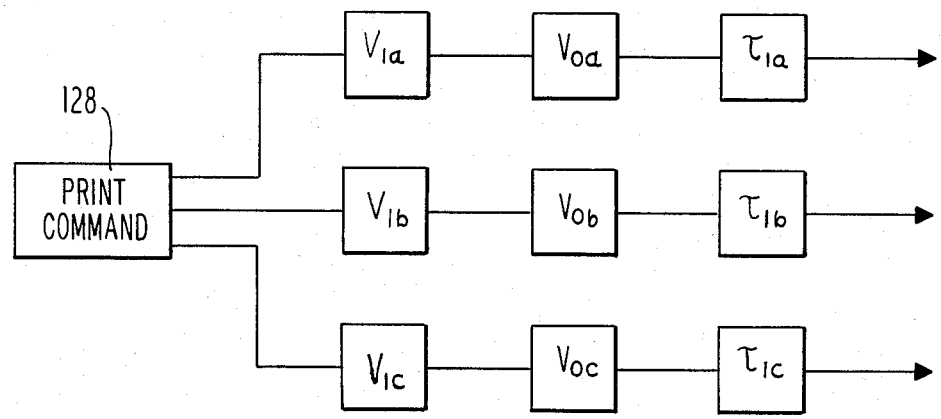
FIG. 6 is a block diagram of circuitry for achieving appropriate wave shaping with respect to a plurality of jets in an array.
Figure 7:
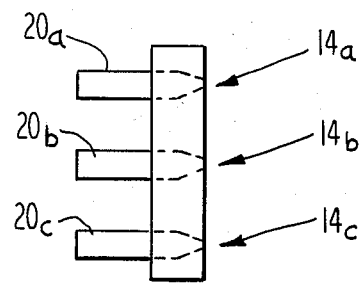
FIG. 7 is a schematic diagram of an array of ink jets of the type shown in FIG. 1.

FIG. 6 depicts drive circuitry associated with a plurality of ink jets of the type shown in FIG. 1 which are shown in somewhat schematic form in FIG. 7. In order to assure that each of the orifices $14_{a-c}$ in the array of ink jets shown in FIG. 7 behave uniformly, transducers $20_{a-c}$ shown in FIG. 7 are driven by the circuitry of FIG. 6 which operates in the following manner.

In response to each print command to each channel in the array as generated by the print command circuit 128, unique periods $\tau_{1a}$, $\tau_{1b}$ and $\tau_{1c}$ are generated between times $t_1$ and $t_2$. In other words, the period $\tau_1$ between times $t_1$ and $t_2$ for each of the channels is varied or even dynamically varied so as to assure that the meniscus 26 in each of the orifices $14_{1-3}$ is traveling at a predetermined velocity and will reach a predetermined position within the orifice at the time of firing. Similarly, the values of the voltage $V_{0a}$, $V_{0b}$ and $V_{0c}$ are varied or dynamically varied for each channel to assure the desired droplet velocity and drop size. A similar variation or dynamic variation is made with respect to the perturbation voltages $V_{1a}$, $V_{1b}$ and $V_{1c}$ between $t_2$ and $t_3$. In this manner, variations from channel to channel may be corrected by microprocessor in combination with a buffer and waveshape circuit depicted by the various blocks $V_{1a}$, $V_{1b}$, $V_{1c}$, $V_{0a}$, $V_{0b}$, $V_{0c}$, $\tau_{1a}$, $\tau_{1b}$ and $\tau_{1c}$ shown in FIG. 6.

In describing the preferred embodiment of the invention, a particular ink jet configuration has been disclosed. This configuration is described in detail in co-pending application Ser. No. 336,603, filed Jan. 4, 1982 which is assigned to the assignee of this invention and incorporated herein by reference. This particular ink jet is desirably operated utilizing the voltage wave shapes shown in FIG. 3. However, it will be understood that other wave shapes would be appropriate for driving other ink jet configurations. For example, it may be desirable to fill another ink jet configuration when the transducer is in the quiescent state and the applied voltage is zero. In such a configuration, firing would occur by energizing the transducer so as to reduce the chamber volume below the volume present when the transducer is in the quiescent state. It will also be understood that certain transducers may respond to a variation in drive current rather than drive voltage. It will therefore be understood that the term drive as utilized in the appended claims is of sufficient breadth to embrace voltage or current as well as non-electrical units of energy measurement. It will be appreciated that the term controlled as utilized with respect to any parameter refers to the selection of the parameter for one or more channels. The term variation or dynamic variation utilized in connection with $\tau_1$, $V_0$ and $V_1$ refers to changes in $\tau_1$, $V_0$ and $V_1$ "on the fly" from droplet ejection to droplet ejection.

Although a particular embodiment of the invention has been shown and described and others suggested, other embodiments and modifications will occur to those of ordinary skill in the art which will fall within the true spirit and scope of the appended claims.

I claim:

1. A method of operating a demand ink jet comprising a variable volume chamber, a transducer coupled to the chamber for varying the volume of the chamber and an ink droplet ejection orifice communicating with the chamber, said method comprising:
   applying a drive level to said transducer so as to permit filling of said chamber and the formation of a meniscus at the orifice, said drive level expanding the volume of said chamber to a volume larger than the volume of said chamber when the transducer is in the quiescent state;
   creating a perturbation in the drive level applied after filling has been initiated so as to move the meniscus away from the chamber in response to the perturbation;
   substantially changing the drive level applied to the transducer immediately after the perturbation so as to eject a droplet from said orifice; and
   controlling the time lapse between the perturbation and the substantial change in the drive level so as to control the position and the velocity of the meniscus immediately prior to ejection.

2. A method of operating an ink jet comprising a variable volume chamber, a transducer coupled to the chamber for varying the volume of the chamber, and an ink droplet ejection orifice communicating with the chamber having a meniscus of ink formed therein, said method comprising the following steps:
   filling the chamber during a first period;
   initiating an abrupt and relatively small volumetric change in the chamber, substantially at the onset of a second period;
   initiating an abrupt movement of said meniscus in said orifice outwardly away from said chamber substantially coincident with said relatively small volumetric change;
   initiating an abrupt and relatively large volumetric change in the chamber at the conclusion of said second period;
   initiating a subsequent abrupt movement of said meniscus in said orifice outwardly away from said chamber substantially coincident with said relatively large volumetric change;
   projecting a droplet of ink from the orifice after the movement of the meniscus forms a droplet; and
   controlling the length of the second period as a function of droplet projection rates.

3. A method of operating an ink jet comprising an ink chamber and an orifice, said chamber containing a volume of ink with a meniscus formed in the orifice, said method comprising the following steps:
   increasing the volume of ink in the chamber;
   perturbing the meniscus of ink in the orifice after the volume has been increased;
   advancing the meniscus in the orifice away from the chamber after perturbing the meniscus; and
   abruptly reducing the volume of ink in the chamber when the meniscus reaches a predetermined velocity and a predetermined position in the orifice.

4. The method of claim 3 including the step of controlling the time lapse between perturbing the meniscus and abruptly reducing the volume.

5. The method of claim 3 including the step of varying the time lapse between perturbing the meniscus and abruptly reducing the volume.

6. The method of claim 3 wherein the step of abruptly reducing the volume of ink minimizes the rate of change of the volume rate of change.

7. The method of claim 6 wherein the amount the volume is abruptly reduced is controlled.

8. The method of claim 6 wherein the duration of the abrupt reduction in volume is controlled.

9. The method of claim 6 wherein the amount the volume is abruptly reduced is varied.

10. The method of claim 6 wherein the duration of the abrupt reduction in volume is varied.

11. A method of operating a plurality of ink jets, each of said jets comprising an ink chamber and orifice, said chamber containing a volume of ink with a meniscus formed in the orifice, said method comprising the following steps:
    increasing the volume of ink in the chamber of each jet;
    perturbing the meniscus of ink in the orifice of each jet after the volume has been increased;
    advancing the meniscus in the orifice of each jet away from the chamber after perturbing the meniscus; and
    abruptly reducing the volume of ink in the chamber of each jet when the meniscus reaches a predetermined velocity and a predetermined position in the orifice.

12. The method of claim 11 including the step of controlling the extent of perturbing for each jet.

13. The method of claim 11 including the step of varying the extent of perturbing for each jet.

14. The method of claim 11 including the step of dynamically varying the extent of perturbing for each jet.

15. The method of claim 11 including the step of controlling the time lapse for each jet between perturbing the meniscus and abruptly reducing the volume.

16. The method of claim 11 including the step of individually varying the time lapse for each jet between perturbing the meniscus and abruptly reducing the volume.

17. The method of claim 11 including the step of individually dynamically varying the time lapse for each jet between perturbing the meniscus and abruptly reducing the volume.

18. The method of claim 11 wherein the step of abruptly individually reducing the volume of ink in each jet minimizes the rate of change of the volume rate of change.

19. The method of claim 11 wherein the amount the volume is abruptly individually reduced is controlled in each jet.

20. The method of claim 11 wherein the amount of the volume is abruptly individually reduced is varied in each jet.

21. The method of claim 11 wherein the amount the volume is abruptly individually reduced is dynamically varied in each jet.

22. The method of claim 11 wherein the duration of the abrupt individual reduction in volume is controlled in each jet.

23. The method of operating an ink jet comprising an ink chamber and orifice, said chamber containing a volume of ink with a meniscus formed in the orifice, said method comprising the following steps:
increasing the volume of ink in the chamber so as to fill the chamber; and
substantially reducing the volume of ink in the chamber so as to minimize the rate of change of the volume rate of change of the volume of ink so as to project a droplet of ink from the chamber without satellite droplets.

24. The method of claim 23 including the step of controlling the magnitude of the reducton in volume.

25. The method of claim 23 including the step of controlling the duration in which the magnitude of the volume is substantially reduced to eject a droplet of ink.

26. A method of operating a demand ink jet comprising an ink chamber and an orifice, said chamber containing a volume of ink before filling and after ink ejection from said orifice so as to have a meniscus of ink in said orifice, said method comprising the following steps:
expanding the volume of ink for a predetermined period of time;
filling the chamber with ink and retracting said meniscus in said orifice during said predetermined period of time;
contracting the volume of ink so as to eject a droplet of ink from the orifice; and
repeating the steps of expanding, filling and contracting for each droplet of ink to be ejected;
said predetermined period of time for expanding said filling remaining substantially constant for each droplet ejected from said orifice.

27. The method of claim 26 wherein the ink jet comprises a transducer, said method including the step of energizing said transducer during expanding and filling and de-energizing said transducer during contracting.

28. A method of operating a demand ink jet comprising an ink jet chamber and an orifice, said chamber containing a volume of ink before filling and after ink ejection from said orifice so as to have a meniscus of ink in said orifice, said method comprising the following steps;
initiating filling of said chamber and retracting said meniscus in said orifice upon demand prior to ejecting ink from said orifice; and
ejecting ink from said orifice a predetermined period of time after filling is initiated.

29. The method of claim 28 wherein said ink jet comprises a transducer, said filling and said ejecting occurring in response to changes in the state of energization of said transducer.

30. The method of claim 28 wherein said ink jet comprises a transducer, said filling being initiated by energization of said transducer and said ejecting resulting from de-energization of said transducer.

31. A method of operating a demand ink jet comprising an ink chamber and an orifice, said chamber containing a volume of ink and said orifice having a meniscus of ink therein, said method comprising the following steps:
initiating filling of said chamber on demand in response to expanding said volume;
retracting said meniscus in said orifice in response to said filling; and
ejecting ink at said meniscus from said volume through said orifice in response to contracting said chamber a predetermined period of time after initiating filling.

32. The method of claim 31 wherein said jet comprises a transducer, said chamber being filled, said meniscus being retracted and said ink being ejected in response to changes in the state of energization of said transducer.

33. The method of claim 31 wherein said jet comprises a transducer, said filling of said chamber and said retracting of said meniscus being initiated by energization of said transducer and said ejecting of ink resulting from de-energization of said transducer.

34. A method of operating a demand ink jet comprising a variable volume chamber, a transducer coupled to the chamber for varying the volume of the chamber and an ink droplet ejection orifice communicating with the chamber, said method comprising:
applying a drive level to said transducer so as to permit filling of said chamber in the formation of a meniscus at the orifice;
creating a perturbation in the drive level applied after filling has been initiated so as to move the meniscus away from the chamber in response to the perturbation, said perturbation comprising an abrupt instantaneous drive level change from a first level to a second level;
substantially changing the drive level applied to the transducer immediately after the perturbation so as to eject a droplet from said orifice, said change in level being from a second level to a third level;
controlling the time lapse between the perturbation and the substantial change in drive level so as to control the position and the velocity of the meniscus immediately prior to ejection; and
maintaining the second level during the time lapse wherein the duration of the second level during the time lapse is relatively short compared to the duration of the first level and the duration of the third level.

35. A method of operating a demand ink jet comprising a variable volume chamber, a transducer coupled to the chamber for varying the volume of the chamber and an ink droplet ejection orifice communicating with the chamber, said method comprising:
applying a drive level to said transducer so as to permit filling of said chamber and the formation of a meniscus at the orifice;
creating a perturbation in the drive level applied after filling has been initiated so as to move the meniscus away from the chamber in response to the perturbation;

substantially changing the drive level applied to the transducer immediately after the perturbation so as to eject a droplet from said orifice;

controlling the time lapse between the perturbation and the substantial change in the drive level so as to control the position and the velocity of the meniscus immediately prior to ejection; and dynamically varying the duration of the second level.

36. A method of operating an ink jet comprising a variable volume chamber, a transducer coupled to the chamber for varying the volume of the chamber, and an ink droplet ejection orifice communicating with the chamber having a meniscus of ink formed therein, said method comprising the following steps:

filling the chamber during a first period;

initiating an abrupt and relatively small volumetric change in the chamber, substantially at the onset of a second period;

initiating an abrupt movement of said meniscus in said orifice outwardly away from said chamber substantially coincident with said relatively small volumetric change;

initiating an abrupt and relatively large volumetric change in the chamber at the conclusion of said second period;

initiating a subsequent abrupt movement of said meniscus in said orifice outwardly away from said chamber substantially coincident with said relatively large volumetric change;

projecting a droplet of ink from the orifice after the movement of the meniscus forms a droplet; and minimizing the rate of change of volume during said abrupt and relatively large volumetric change.

* * * * *